US009135331B2

(12) United States Patent
Rosenthal et al.

(10) Patent No.: US 9,135,331 B2
(45) Date of Patent: Sep. 15, 2015

(54) INTERFACE INCLUDING GRAPHIC REPRESENTATION OF RELATIONSHIPS BETWEEN SEARCH RESULTS

(76) Inventors: Philip J. Rosenthal, Washington, DC (US); Ed Walters, Alexandria, VA (US); Andrew T. Schiebler, Bethesda, MD (US); Thomas A. Lee, Alexandria, VA (US)

( * ) Notice: Subject to any disclaimer, the term of this patent is extended or adjusted under 35 U.S.C. 154(b) by 618 days.

(21) Appl. No.: 12/419,328

(22) Filed: Apr. 7, 2009

(65) Prior Publication Data
US 2009/0276724 A1 Nov. 5, 2009

Related U.S. Application Data

(60) Provisional application No. 61/042,904, filed on Apr. 7, 2008.

(51) Int. Cl.
*G06F 3/0484* (2013.01)
*G06F 17/30* (2006.01)
*G06T 11/20* (2006.01)

(52) U.S. Cl.
CPC ...... *G06F 17/30696* (2013.01); *G06F 3/04847* (2013.01); *G06F 17/30554* (2013.01); *G06F 17/30592* (2013.01); *G06F 17/30699* (2013.01); *G06T 11/206* (2013.01)

(58) Field of Classification Search
CPC .......... G06F 3/04847; G06F 17/30554; G06F 17/30592; G06F 17/30696; G06T 11/206; G06T 2200/24
USPC ............... 715/771, 809, 843; 707/3, E17.108
See application file for complete search history.

(56) References Cited

U.S. PATENT DOCUMENTS

| | | | | | |
|---|---|---|---|---|---|
| 5,832,494 | A | * | 11/1998 | Egger et al. | 707/999.005 |
| 5,894,311 | A | * | 4/1999 | Jackson | 345/440 |
| 5,983,267 | A | * | 11/1999 | Shklar et al. | 709/217 |
| 6,182,091 | B1 | * | 1/2001 | Pitkow et al. | 715/206 |
| 6,188,403 | B1 | * | 2/2001 | Sacerdoti et al. | 715/764 |
| 6,289,342 | B1 | * | 9/2001 | Lawrence et al. | 1/1 |
| 6,289,354 | B1 | * | 9/2001 | Aggarwal et al. | 1/1 |

(Continued)

OTHER PUBLICATIONS

Braam, Robert R., et al., "Mapping of Science by Combined Co-Citation and Word Analysis I. Structural Aspects," Journal of the American Society for Information Science 42(4), 1991, pp. 233-251.*

(Continued)

*Primary Examiner* — Eric J Bycer
(74) *Attorney, Agent, or Firm* — Symbus Law Group, LLC; Clifford D. Hyra

(57) ABSTRACT

A multi-dimensional graphic user interface displays selected types of information regarding items included in one or more databases or returned by a search in accordance with locations on a two-dimensional display area or projection of a three-dimensional space on a two-dimensional area and provides for selective display of information about respective items in a database (e.g. metadata) as additional dimensions of the display which may be suppressed and/or selectively introduced to avoid user distraction or obscuring information or for comparison between screens which may indicate to a user the degree to which a particular item may or may not be germane to an issue or particular subject matter of interest. The graphic user interface thus provides an effective tool for evaluating search results and organizing detailed review thereof.

29 Claims, 11 Drawing Sheets

(56) References Cited

U.S. PATENT DOCUMENTS

| | | | |
|---|---|---|---|
| 6,356,256 B1* | 3/2002 | Leftwich | 345/157 |
| 6,457,028 B1* | 9/2002 | Pitkow et al. | 715/206 |
| 6,496,208 B1* | 12/2002 | Bernhardt et al. | 715/853 |
| 6,581,068 B1* | 6/2003 | Bensoussan et al. | 1/1 |
| 6,629,097 B1* | 9/2003 | Keith | 1/1 |
| 6,665,656 B1* | 12/2003 | Carter | 707/748 |
| 6,707,454 B1* | 3/2004 | Barg et al. | 345/440 |
| 7,134,081 B2* | 11/2006 | Fuller et al. | 715/735 |
| 7,293,228 B1* | 11/2007 | Lessing et al. | 715/229 |
| 7,605,814 B1* | 10/2009 | Critz | 345/440 |
| 7,660,822 B1* | 2/2010 | Pfleger | 707/999.107 |
| 7,921,363 B1* | 4/2011 | Hao et al. | 715/273 |
| 2002/0091679 A1* | 7/2002 | Wright | 707/3 |
| 2003/0001873 A1* | 1/2003 | Garfield et al. | 345/700 |
| 2003/0167278 A1* | 9/2003 | Baudel | 707/102 |
| 2003/0187716 A1* | 10/2003 | Lee | 705/10 |
| 2003/0197702 A1* | 10/2003 | Turner et al. | 345/473 |
| 2003/0200191 A1* | 10/2003 | Pao et al. | 706/47 |
| 2004/0015481 A1* | 1/2004 | Zinda | 707/1 |
| 2004/0183800 A1* | 9/2004 | Peterson | 345/440 |
| 2005/0012743 A1* | 1/2005 | Kapler et al. | 345/419 |
| 2005/0022106 A1* | 1/2005 | Kawai et al. | 715/500 |
| 2005/0075965 A1* | 4/2005 | Cutler | 705/37 |
| 2005/0081146 A1* | 4/2005 | Tanaka et al. | 715/517 |
| 2005/0203924 A1* | 9/2005 | Rosenberg | 707/100 |
| 2006/0106847 A1* | 5/2006 | Eckardt et al. | 707/101 |
| 2006/0164409 A1* | 7/2006 | Borchardt et al. | 345/419 |
| 2006/0206512 A1* | 9/2006 | Hanrahan et al. | 707/102 |
| 2006/0262145 A1* | 11/2006 | Zhang et al. | 345/661 |
| 2006/0277132 A1* | 12/2006 | Brooks | 705/35 |
| 2007/0061611 A1* | 3/2007 | Mackinlay et al. | 714/5 |
| 2007/0203902 A1* | 8/2007 | Bauerle et al. | 707/5 |
| 2007/0211056 A1* | 9/2007 | Chakraborty et al. | 345/440 |
| 2007/0239704 A1* | 10/2007 | Burns et al. | 707/5 |
| 2007/0239706 A1* | 10/2007 | Zhang et al. | 707/5 |
| 2007/0247462 A1* | 10/2007 | Bell et al. | 345/440 |
| 2007/0255686 A1* | 11/2007 | Kemp et al. | 707/3 |
| 2008/0162209 A1* | 7/2008 | Gu et al. | 705/7 |
| 2008/0163085 A1* | 7/2008 | Subbu et al. | 715/763 |
| 2008/0195930 A1* | 8/2008 | Tolle | 715/227 |
| 2008/0215496 A1* | 9/2008 | Hockley et al. | 705/36 R |
| 2008/0243787 A1* | 10/2008 | Stading | 707/3 |
| 2008/0288527 A1* | 11/2008 | Ames et al. | 707/102 |
| 2009/0150440 A1* | 6/2009 | Buck et al. | 707/104.1 |
| 2009/0222412 A1* | 9/2009 | Lee et al. | 707/3 |

OTHER PUBLICATIONS

Noyons, E.C.M., et al., "Combining Mapping and Citation Analysis for Evaluative Bibliometric Purposes: A Bibliometric Study," Journal of the American Society for Information Science 50(2), 1999, pp. 115-131.*

Small, Henry, "Visualizing Science by Citation Mapping," Journal of the American Society for Information Science 50(9), 1999, pp. 799-813.*

Erten, Cesim., et al., "GraphAEL: Graph Animations with Evolving Layouts," Spring-Verlag Berlin Heidelberg, 2004, pp. 98-110.*

Hanrahan et al., "Tableau Software: Visual Ananlysis for Everyone," Jan. 2007, 26 pages.*

* cited by examiner

INTERFACE INCLUDING GRAPHIC REPRESENTATION OF RELATIONSHIPS BETWEEN SEARCH RESULTS

CROSS-REFERENCE TO RELATED APPLICATIONS

This application claims priority to U.S. Provisional Application 61/042,904, filed Apr. 7, 2008.

BACKGROUND OF THE INVENTION

1. Field of the Invention

The present invention generally relates to data processing for searching of databases and, more particularly, to graphic interfaces for facilitating evaluation of and navigation through groups of items such as results of searches containing potentially related information not necessarily responsive to a search query such as documents, articles and the like which may cite other such documents, articles and the like and which has particular utility for legal, medical, scientific and similar types of research.

2. Description of the Prior Art

Since the development of the digital computer, a principal use for data processing systems has been for managing and retrieving data of interest from one or more databases including potentially vast amounts of information. Expediting the return of search results has been a major goal of such systems and many approaches to the development of efficient search engines and algorithms have been proposed with greater or lesser degrees of success, which often varies with the nature of the subject matter of the data in a given database as well as the size of the databases which are searched and the processing power available. In general, such search engines must also be able to accommodate a search query that may be in a fairly rigidly expressed form (e.g. key words with Boolean operators) but yet can express an arbitrary search query and also provide for manipulation of the search query (e.g. logical combinations of search queries in accordance with Boolean operators) to provide some degree of control to the user over the unavoidable trade-off between the number of returned search results, the relevance of the information returned and the likelihood that highly germane information will not be returned in response to a particular search query.

Unfortunately, to be reasonably certain that all highly germane information is included in the search results, the search query will usually be required to be of sufficient breadth that the search results themselves may be quite numerous. The searcher will then have no alternative but to review the entirety of the search results to (often subjectively) determine the most relevant information which is actually sought among the search results with little or no guidance as to the relative likelihood that a given article or document will be the document or article actually sought or even which group of articles or documents will be most likely to contain it. This lack of guidance is largely because of the trade-off noted above which implies a high likelihood of exclusion of the article or document actually sought by any limitation of the search query or results.

To expedite this process while reducing the likelihood of exclusion of germane results, numerous sorting algorithms and techniques have been proposed and which have also provided widely varying degrees of success. Most such sorting arrangements, in practice, merely estimate a rating or a rank of the individual search results in accordance with a degree of accuracy of match to the search query that produced them and are thus highly dependent on user input based on relatively minimal information in regard to the actual content of the database; resulting in only marginal effectiveness in many cases. Often such sorting algorithms and methodologies are based on citations of other documents or articles in the database and seek to determine relevance from some combination of or relationship between the documents or articles containing citations to other particular documents or articles and/or the number of citations to particular documents or articles between different groups of documents or articles such as between databases or results of different searches or the like. However, one particularly effective sorting arrangement is disclosed in U.S. patent application Ser. No. 09/707,911, entitled "Improved Relevance Sorting for Database Searches", filed Nov. 8, 2000, by Edward J. Walters et al. and which is hereby incorporated in its entirety by reference. While the sorting provided by this arrangement allows very substantial control over sorting and re-sorting of the search results while allowing the user to compare results of a sort to determine further searching and/or sorting options, the result remains in the form of a list or lists which may not be optimally assimilated by a user. For example, as a practical matter, a displayed list can only show a limited number of responses to a query that may be a very small proportion of the results returned. The efficiency of the sorting arrangement may thus cause highly relevant material to be distributed over several screens; thus necessarily excluding some relevant items from any given screen and removing them from view while the user attempts to refine the search or sorting of results if such facilities are provided. Further, some information that could be important in refining the search or sorting of results may not be directly responsive to a search and cannot be easily portrayed in a manner easily assimilable by a user.

In this regard, it has long been recognized in the data processing arts that the amount of processing power and the efficiency of algorithms that can be brought to bear on a particular data processing task are of little effectiveness beyond the ability or capacity of a user to assimilate the results of the processing performed. This fact is particularly characteristic of database searches in legal, medical and scientific fields where there are both objective and subjective aspects of determination of the most germane information within particular search results. For example, while powerful computers running the most efficient and effective searching and sorting algorithms, determination of the most germane information may still require critically reading through and comparing at least a significant number of the returned documents or articles (or, in the field of legal research, published decisions which are intended to be included within the terms "articles", "documents" or "items") rated or ranked as most highly relevant (e.g. by estimating degree of match to the search query by the numbers of instances of appearances of search terms or associations of search terms, combinations of citations or the like criteria) to determine those which are the most authoritative as well as the relationships to subject matter and the relationship of decisions rendered to other reported decisions. Such a detailed review may thus require many times longer than the searching and sorting processes and, to date, no system or interface has proven significantly more effective than a sorted list which requires such review and which is subject to error (or differences in estimated match to the search query as an indicator of likely relevance based on insignificant differences in scores made for ranking search results) while not supporting any application of subjectivity or expertise on the part of the searcher other than through such a detailed and critical review.

Additionally, in many fields, and legal research in particular, several different types of criteria may be applied to determination of relevance, authority and other qualities (e.g. an indication of the history and/or development of the line of reasoning represented) which may be of interest in the information sought or may indicate that a particular document or group of documents is germane to the search, whether or not included in a particular set of search results, and thus may require multiple dimensions (both qualitative and quantitative) to represent the information which may be available and of interest. Such information would necessarily be omitted or obscured in known displays of lists which only show one screen at a time; each screen containing on a partial list of search results.

Unfortunately, while visual displays have proven, over many years, to be the most effective as well as most efficient medium for an interface to present information to a user, such displays are limited to two (e.g. Cartesian) dimensions. While numerous graphic features (e.g. color, textures and the like visual effects, sometimes collectively referred to as attributes hereinafter) are known as well as various juxtapositions of data for representing more than two dimensions simultaneously, even the most skillful interface design cannot guarantee that the information can be assimilated rapidly, accurately or reliably by a user in order to be useful in selecting particular data of interest from among the potentially large amount of information that may be returned in response to a query and presented to a user or which is to be otherwise analyzed using the interface. In other words, while attributes have been used to convey additional information beyond two dimensions they have done so in a largely non-intuitive manner which does not aid in assimilation of information and, moreover, as provision is made for portraying more types of information, do so at the substantial risk of developing image complexity which can obscure information. Also, even if data is not obscured by image complexity, while a very rich amount of data and interrelationships may, in theory be presented, the user is only provided with relatively minimal control over the display and, hence, the level of expertise which must be brought to bear on the analysis process is extremely high. To date, no such multi-dimensional display has proven effective for recognition of particular relevance in combination with authority and other qualities of documents in a search result and which also provides highly intuitive control and selective data suppression to facilitate human analysis, particularly for the purpose of refining ordering of search results for detailed review and expediting discovery of highly germane documents included in the search results.

SUMMARY OF THE INVENTION

Accordingly, the present invention provides an interface for simultaneously displaying a representation of an entire set of items such as search results or even the entire contents of a database and graphically indicating relationships between individual search results from which both relevance, chronology and authoritativeness of documents, articles and/or reported legal decisions may be readily discerned while other information not necessarily responsive to a search query may be portrayed in a selectable number of additional dimensions or information (whether or not responsive to a search query) selectively suppressed to facilitate review and manual ordering of search results for detailed review thereof. Provision is made for a user to selectively introduce or remove graphical and/or textual information in different screen displays and to toggle between them to observe changes which may be of significance in conveying and assimilating information by which comparative relevance of items may be readily discerned.

In order to accomplish these and other objects of the invention, a graphic user interface capable of display of different types of information about a set of items in a predetermined number of dimensions is provided including indicia representing individual items of a set of items at respective locations on a two dimensional display area wherein the items represent a physical object or data representing a physical object, and indicia which may be displayed in connection with said locations representing additional information pertaining to respective items as additional dimensions of the graphic user interface.

In accordance with another aspect of the invention, a method of operating a search engine for searching a database is provided including configuring data processing apparatus to include a memory for storing data derived from parsing items in said database, and a display generator for representing respective types of the data derived from parsing the items in the database as additional dimensions on a two dimensional display, wherein a number of said dimensions representing types of data and which are included in an image produced on a display driven by the display generator is selectable by a user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
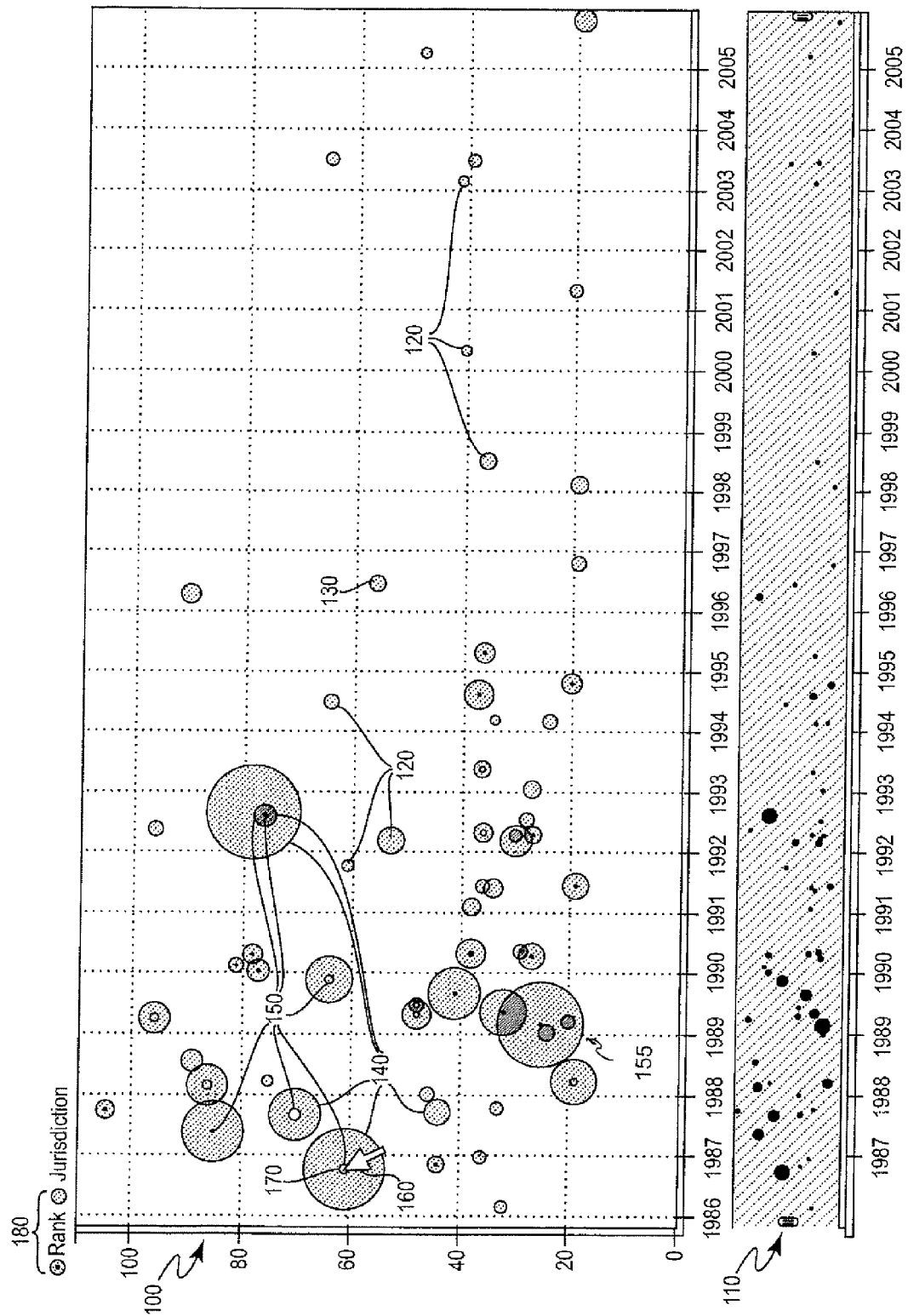
FIG. 1 is a representation of an interface screen in accordance with the invention.

Referring now to the drawings, and more particularly to FIG. 1, there is shown a representation of an exemplary interface screen in accordance with the invention. As noted above, search engines and algorithms have become quite sophisticated and many, such as that disclosed in the above-incorporated U.S. patent application Ser. No. 09/707,911, are capable of carrying out statistical analyses on the text and other content of a document, article or published decision to make an estimate of relative degree of match to a search query. Such statistical studies may be based on a wide variety of features of the individual items being searched such as the number of times particular search terms appear, the proximity/separation of search terms in the text and various aspects (e.g. number, proximity, relationships, and the like) in regard to citations to previous documents, articles and/or published decisions.

As disclosed in the above-incorporated patent application Ser. No. 09/707,911, the latter information can be obtained automatically by parsing a document (particularly a published decision) and extracting text which is of a particular form unique to citations of other documents, articles and/or published decisions. These extracted citations and the circumstances (e.g. date, number, location, relative locations and, if included, an indication of the nature/treatment of a cited decision relative to another cited decision) may be placed in tables as metadata in regard to each search result or item in the database and are thus available for various forms of analysis for ordering of search results by estimated degree of match to the search query and/or as an indicator of relevance and/or authority under each supported and available analysis technique, as may be selected by a user.

However, once an ordering of search results has been performed and presented to a user in the form of a list, the actual data on which the ordering is performed is effectively hidden while valuable insights into relevance and authority might be derived therefrom. On the other hand, since such an ordering may be derived from many pieces of information and many manipulations of that information during analysis, presenting all available information to a user may, in fact, obscure the very insights that might be derived and at the very least, much of the detail of such information may certainly prove distracting and/or unimportant to the discernment of relative relevance and authority of the search results. Thus, by presenting such data in a form in accordance with the invention, presentation of unimportant details may be avoided or well and easily controlled at the will of the user as will be discussed below while clearly presenting information which is extremely helpful in an easily assimilated quasi-qualitative graphic form (e.g. graphic indicia having attributes based on quantitative data but which facilitate comparative assimilation) or quantitatively; supporting and facilitating a determination of which search results are likely to be most germane for further detailed review and relative relevancy and authoritativeness of search results.

Figure 2:
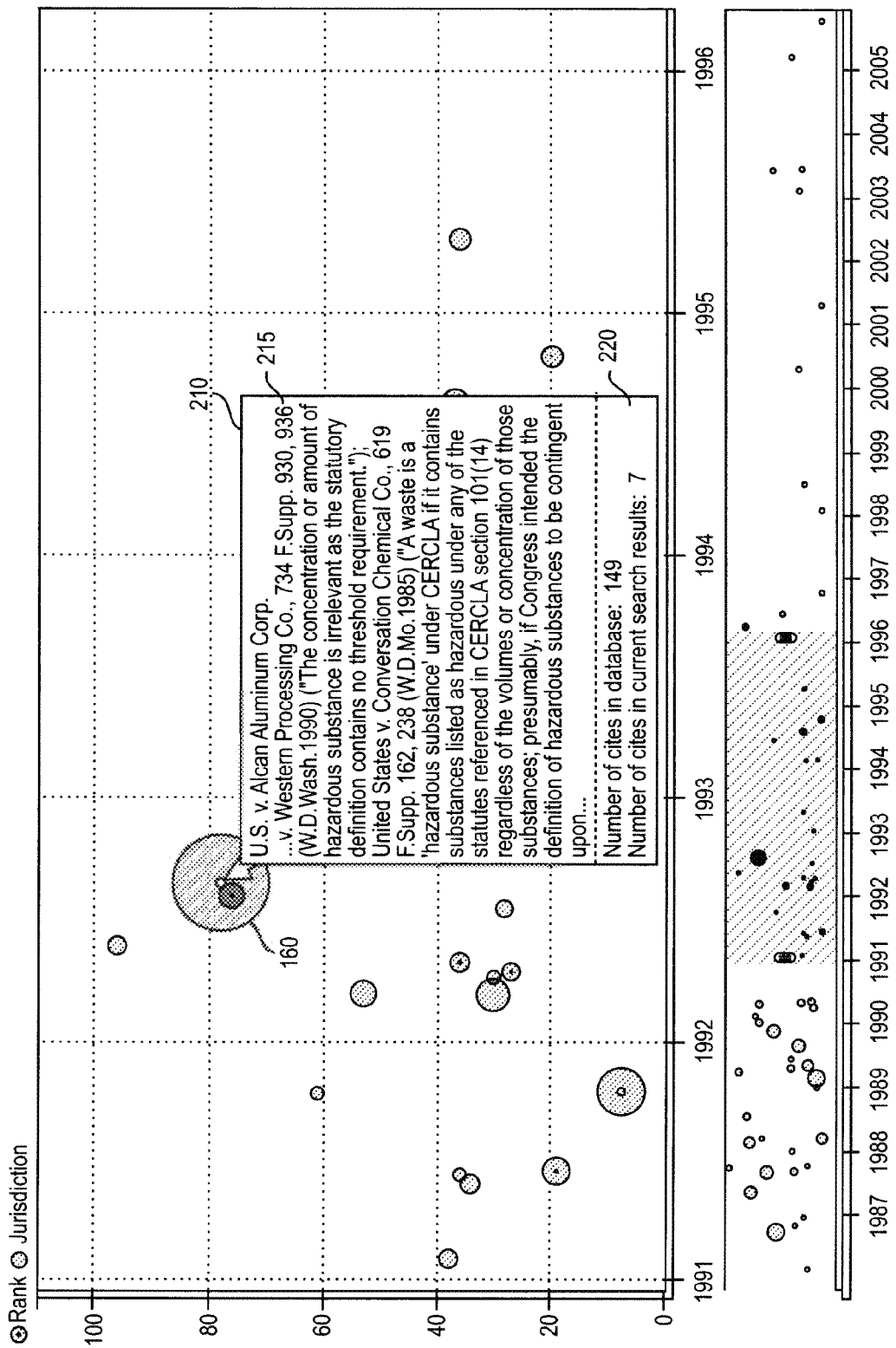
FIG. 2 is a representation of an alternative interface screen in accordance with the invention.

These qualities are abundantly evident in the exemplary interface screen in accordance with the invention as illustrated in FIG. 1. Specifically, in the interface screen of FIG. 1, the screen is divided into two two-dimensional areas 100 and 110. The lower of these areas, as depicted, presents a secondary display 110 forming a less detailed condensation or abridgement of the information in (or available for) the upper display and may be used in a manner similar to a so-called scroll bar or editing tool (much in the manner of editing motion picture graphics but directed to a single, extended array of image data rather than a sequence of images; an example of which is illustrated in FIG. 2 where the X-axis is expanded in accordance with the date range indicated by a highlighted portion of display 110) for the presentation in the upper display 100.

The upper display 100 represents at least four dimensions of information/metadata developed as described above and, preferably, as described in the above-incorporated U.S. patent application Ser. No. 09/707,911; which number of dimensions can preferably be increased or decreased at the will of the user. Specifically, the horizontal axis preferably corresponds to date of the article, document, published decision or other physical article or information representing such a physical object, hereinafter sometimes collectively referred to as an "item". The vertical axis may selectively indicate either rank in accordance with some parameter which may be intrinsic or may be developed through analysis (e.g. relevance score) or by (in the case of published decisions) jurisdiction or other parameter generally indicative of authority (e.g. court hierarchy or specific jurisdiction), or both or neither as will be discussed below. (In medical or scientific fields, the corresponding parameter might well be the reputation of the publisher or sponsor, such as peer-reviewed journals of particularly well-respected professional organizations such as the American Medical Association or the Institute of Electrical and Electronic Engineers.) Each item is thus represented as a location of a point 120 in the two-dimensional area of upper display 100. A selected item 130 is preferably located at the center (at least in the horizontal direction) of area 100 and the selection of such an item can be made, for example, from a prioritized list previously presented to the user as disclosed in the above-incorporated U.S. patent application Ser. No. 09/707,911, from selection of another location 120 in the display of FIG. 1 as will be described in greater detail below or in other ways that are not important to the practice of the invention but will become apparent to those skilled in the art in view of this discussion of the invention.

Figure 4A:
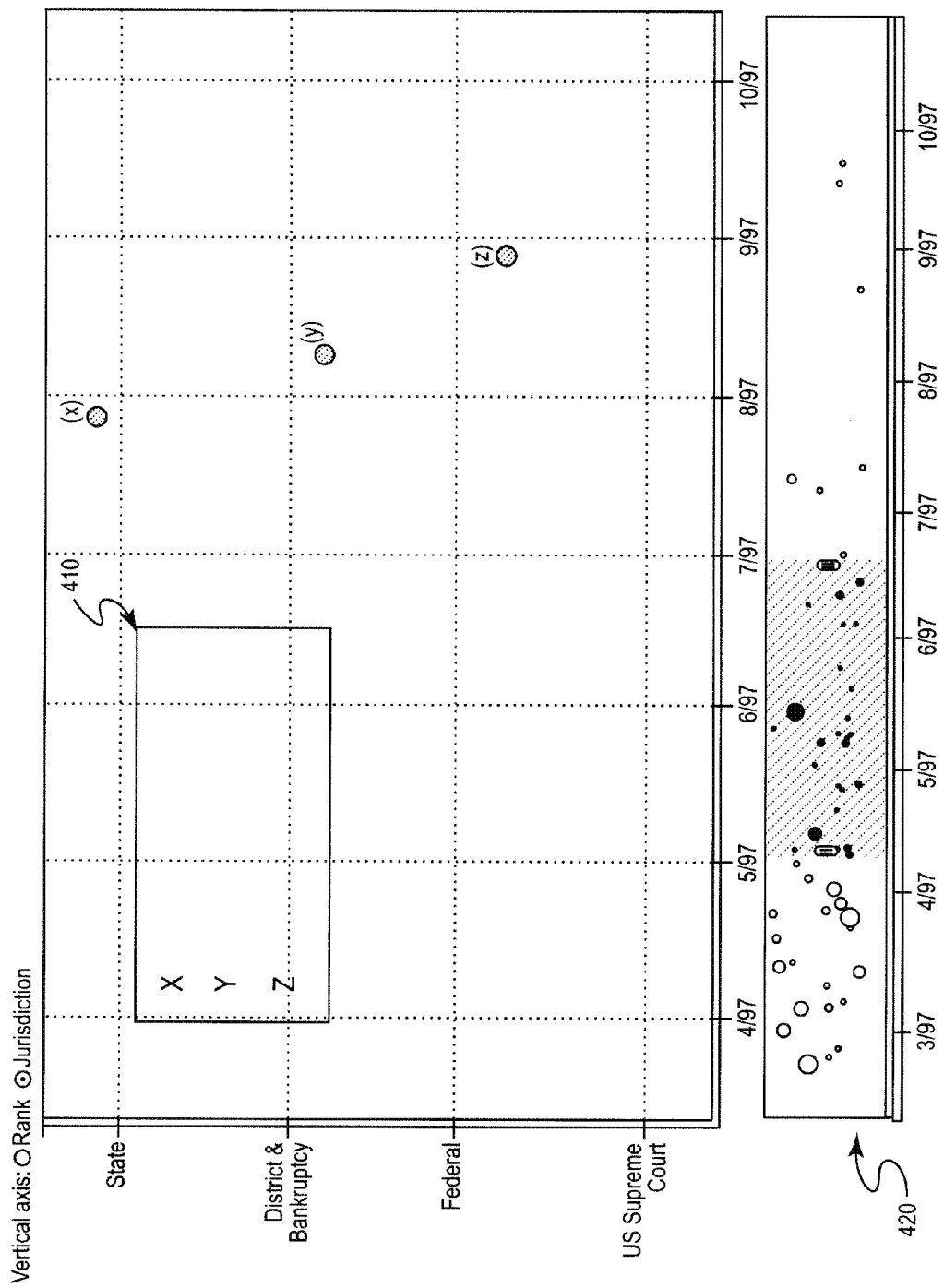
FIGS. 4A, 4B, 4C, 5A, 5B, 6, 7A, 7B, 8A, 8B, 8C and 8D illustrate interface screen images using individual and combinations of the functionalities of the present invention which have been found to be of particular utility.
Figure 4B:
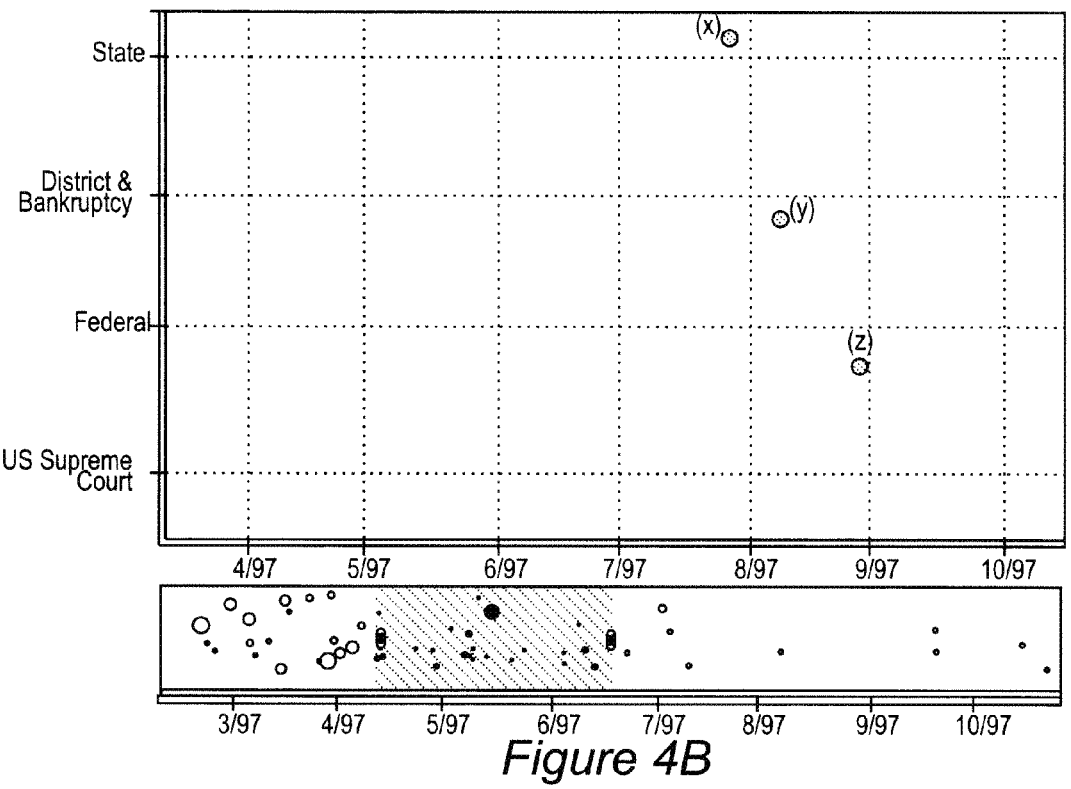
Figure 4C:
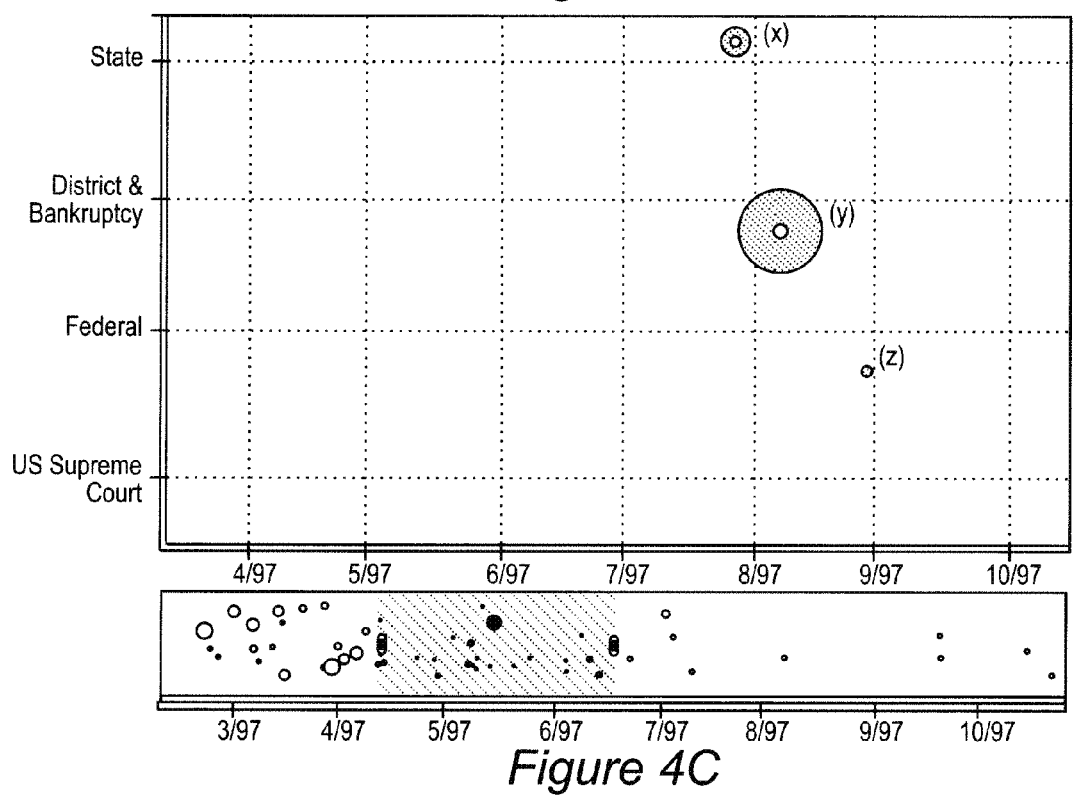

Once a particular item depicted by location 130 is selected, the remainder of the items displayed at locations 120 are limited to the earlier items for which citations are included in the item represented at location 130 which are displayed to the left of location 130 and later items represented at locations 120 to the right of the location 130 which contain citations to the item represented at location 130. Thus, a third dimension of the interface of FIG. 1 is the number of items cited in or cited to by other items in the database or returned by a search conducted according to a given query (indicated by the number of locations 120) which may be an indicator of, for example, the degree of thoroughness of the search or accuracy of the search query to produce a relatively comprehensive result. Since the number of items displayed may be large, it is preferred to provide the user an option of limiting the number of indicia representing items included in the display to an arbitrary number (e.g. 100, 50 or even a date range as described above or a single line of related items such as is illustrated in FIGS. 4A-4C, described below). Such an option can be easily exercised by any of a number of known or foreseeable display features such as a so-called pull-down menu, text or dialog box or the like as will be apparent to those skilled in the art.

Other dimensions in the interface display 100 depicted in FIG. 1 are provided by the concentric circles 140, 150 of varying diameter around locations 120. Larger concentric circles enclosing locations can represent the number of citations by or to the corresponding item in the entire database (or a particular selected database which is not necessarily the same database in which the search was conducted) or a subset of items in the same of another database, possibly as a result of a different search. Colors or other attributes of the concentric circles may indicate the nature/treatment of the citation or comparative treatment of the subject matter, such as a reversal of one published decision in another published decision. may be emphasized by color, blinking or the like of the concentric circle as additional dimensions of the display. The smaller concentric circle can represent the number of citations to that corresponding item in another subset of the same or another database that could be derived from, for example, yet another search that could be substantive, statistical or chronological (e.g. bounded by particular dates or with one or more alternative search terms). A preferred parameter to display in this manner is the number of times items represented on the screen cite to or are cited by each other. It should also be appreciated in this regard that points/locations which may also include concentric circle indicia may be overlaid or partially overlaid but not concentric (such as are indicated at 155) and thus represent different items returned by the search. Such items are readily distinguishable by a user from the concentric circles by variance of position and the distinction can be further enhanced by applying differences in color, brightness, outline (e.g. self-contrasting in regard to the image) or other attributes as will be apparent to those skilled in the art.

The interface of FIG. 1 is also preferably provided with a cursor 160 (or other known or foreseeable selection device) which, when the interface is in operation, may be used to select an item by location on the display 100 (and also to manipulate the overall display 100 through use of display 110 such as by horizontal expansion, contraction, position and/or truncation). It is contemplated that when an item depicted at, for example, location 170 is selected, the display will be reconfigured by placing the depiction of that item at location 130 (which can then be moved/dragged to another location on the display, if desired) and displaying a new pattern of dots/locations 120, including circles 140, 150, if desired, relative thereto.

In this regard, it should be recalled that the dots/locations displayed represent items cited in the selected item to the left of location 130 and items citing to the selected item to the right of location 130. Thus each item selected will have a unique pattern of locations displayed corresponding to the unique citation pattern which corresponds to the selected item and which reflects an indicator of the authority (e.g. jurisdiction, sponsor or the like) and/or an estimate of relevance while graphically indicating to a user which items are likely to be important to the search and are good candidates for early review while giving an exhaustive indication (within the bounds of the search query) of related items which can serve as an authority check for the search through, among other possible displayed information, indications of citations not necessarily within the search query as alluded to above and as will be discussed further below (e.g. an item not returned by a search but which is cited by or cites to an item which is returned by the search). Additionally, the patterns can be readily compared by alternately selecting particular items.

In this regard, it should be noted that any items that are displayed on a common interface screen with a selected item in accordance with the invention may have a citation relationship between them and when a selection of an item is made, the previously selected item will necessarily remain displayed and is available for a further selection. Further, the general and comparative patterns provide not only useful information to the user while effectively hiding details which might obscure rapid evaluation and review of the search results, but an abrupt change in the number of items displayed and/or the diameter of the concentric circles may indicate important clues to the nature of each item.

For instance, a seminal item considered to be of high authority may make only a passing reference to an issue of interest or may be particularly relevant only to the issue of interest or represent a termination (e.g. first instance or most recent available item) of documentation relevant to an issue of interest would likely be evident from an abrupt change in the number of items or citations reflected in the interface image when another displayed item is selected. Such an abrupt change in numbers of items is represented in a comparison of FIG. 1 with a alternative screen of the interface in accordance with the invention such as that of FIG. 2 in which the items depicted are markedly fewer in number beyond that which would be expected from the time line expansion.

Note also in FIG. 2 that items which lie in the location occupied by the text box 210 of FIG. 2 (which may be invoked, for example, by a so-called "mouse-over" where the cursor is placed on an image representing an item but no selection of the item is otherwise made) may still be depicted at, for example, low contrast such that they are still visible but without compromising readability of the text presented which may be excerpted relevant text based on keywords or search terms an abstract or synopsis of the item or the like. The text box may also provide exact citation statistics which are quantitatively indicated in the display of FIG. 1 but from which exact numbers cannot be accurately determined from the graphic representation (and thus referred to herein as a quasi-qualitative display).

Additionally, not depicted in FIG. 1 but which is illustrated in other Figures and will be discussed in greater detail below, relationships of the items represented in FIGS. 1 and 2 can be indicated by lines of different characters (e.g. solid lines or arrows, multiple or different width lines, dashed or chain lines or arrows, colored or flashing lines or arrows and the like attributes singly or in combination) or having legends associated therewith may be provided to indicate the relative treatment of the subject matter of one item by another (e.g. for published decisions, indications of the decision being affirmed, reversed, distinguished and the like could be indicated) which may be supplemented or alternatively indicated by display attributes applied to the concentric circles, as alluded to above to provide many additional dimensions for presentation of graphic information to a user and which may be selectively controlled by a user to avoid important information being obscured and/or to provide emphasis of information which may be important without distraction of the user. Thus, the number of dimensions which are provided and can be selectively included in interface screens in accordance with the invention is effectively arbitrarily large.

Thus, it is seen that the invention provides a large amount of information that is directly indicative of the development of a refined approach to discovery of commentary in regard to issues and subject matter of interest which is directly useful to a user in determining a course and order of approach to consideration of individual search results far beyond the information and accuracy of estimated match to the search query that can be delivered by a sorted list, particularly when it is considered that a search query must often be formulated broadly to reduce likelihood that the most relevant or most authoritative item will be missed by the search. At the same time, details of information which may clutter the display and obscure the patterns which a user may recognize as possibly indicating usefulness (and which might even serve to identify a particular item which was only vaguely remembered by a user) may be suppressed, hidden to a degree or displayed in an alternative form which is also selectable with substantial flexibility in accordance with the invention as alluded to above and will be further discussed below.

Figure 3:
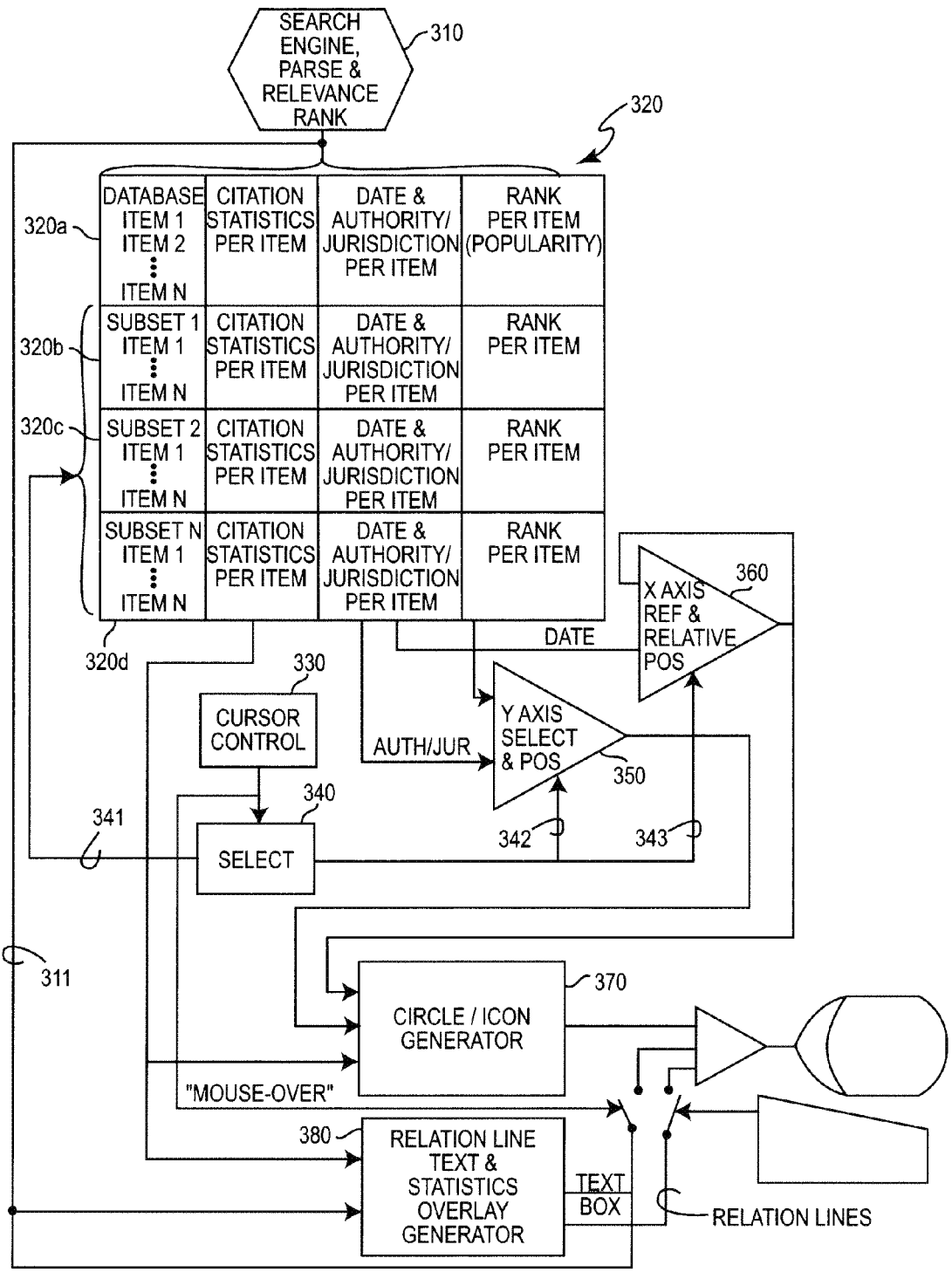
FIG. 3 is a high-level block diagram depiction of an exemplary processing architecture which is useful in conveying and facilitating an understanding of the invention.

An exemplary processing architecture for developing the interface images and facilities described above will now be discussed in connection with FIG. 3. It should be understood that the architecture depicted in FIG. 3 is exemplary and its layout has been configured in the interest of clarity to facilitate an understanding of the basic principles of the invention and the manner in which its functionalities as described above can be achieved. As such, the illustration of FIG. 3 can also be understood as a data flow diagram in regard to the methodology and operation of the invention. Further, it should be understood that the processing architecture and operations as depicted in FIG. 3 is preferably implemented in software both to facilitate further perfecting features such as those which will be described below to be implemented and so that various combinations of functionalities and combinations of image features may be selectively utilized singly or in combinations, examples of which will be discussed in detail below.

In FIG. 3, a search engine 310 preferably provides functions similar to that described in the above-incorporated U.S. Patent Application but any search engine capable of parsing and analyzing contents of a database, conducting a search and sorting the results in accordance with citation statistics, date and authority/jurisdiction and ranking the search results in an ordered list in order of estimated match to a search query can be used in the successful practice of the present invention. The data/metadata developed by the search engine by parsing the contents of a database and at least one corresponding subset of the database such as results of a given search are stored in a data structure 320; the particulars of which are unimportant to the successful practice of the invention. For clarity of illustration, however, data structure 320 is depicted as being organized in groups of rows: group 320a corresponding to the entire database or a portion thereof and groups 320b-320d corresponding to subsets of the database corresponding to results of different search queries. Each line within each group thus corresponds to an item in the database. Particular categories of metadata, preferably including at least citation statistics for each item, a date and jurisdiction/authority for each item and a ranking within the group for each item are provided and are depicted as columns. (It should be noted in this regard that there is no basis for providing a ranking of estimated relevance or the like in regard to an entire database which exists and has a given content regardless of any search query that may be applied thereto to form a subset such as 320b-320d. Nevertheless, it has been found useful to provide for development and storage for a ranking of the contents of an entire database; which ranking could be based on parameters other than those that may be related to a particular search query such as the number of times a particular item has been returned in all search queries for all users over a given period of time or the number of users who have accessed the full text or an excerpt of each item.)

It should be appreciated that all information in data structure 320 is provided through operation of search engine 310 and the derivation thereof, beyond the assumption of the existence and availability of such data/metadata is not otherwise important to the successful practice of the invention. It should also be appreciated that data path 311 corresponds to the direct display of, for example, an ordered list of search results as provided, for example, by the above-incorporated U.S. patent application Ser. No. 09/707,911 without utilization of the present invention.

Cursor control 330 is preferably provided although the hardware used (e.g. cursor keys, mouse, joystick, track-ball, pointing transducer, touch pad or the like) is not important to the practice of the invention as long as it is capable of controlling a cursor image 160 and providing for selection of a location corresponding to an item 120, 130, selection buttons 180 or interacting with display 110. Selection of any of these display features is registered at select register 340 as indicated by respective lines 341, 342 and 343 in FIG. 3. For example, selection of an item at location 120 (or from a list in a prior screen) causes that item to be represented at location 130 (from which it can be dragged to another location, if desired) and other search results re-displayed relative to it in accordance with date information through selector and position mapping arrangement 360. Selection of one of buttons 180 determines the parameter (e.g. authority/jurisdiction or rank) which will be mapped to particular locations in the Y direction under control of a selector/mapper 350. Thus positions of indicia in the preferably Cartesian coordinate system of display area 100 and 110 are determined and this information is combined with citation statistics for respective groups (320a-320d) of items on an item-by-item basis at circle/icon (other shapes or indicia can be used within the scope of the present invention) generator 370. The same citation statistics and other information for a selected item (represented at 130) or other item designated by a "mouse-over" operation or the like is also supplied to overlay generator which provides for generation of graphics box 210, 215, 220 of FIG. 2 which can be overlaid or superimposed on or mixed with the graphics generated at 370. (Relation lines alluded to above are preferably handled in a similar manner as overlays and controlled by user input as well.)

Figure 1A:
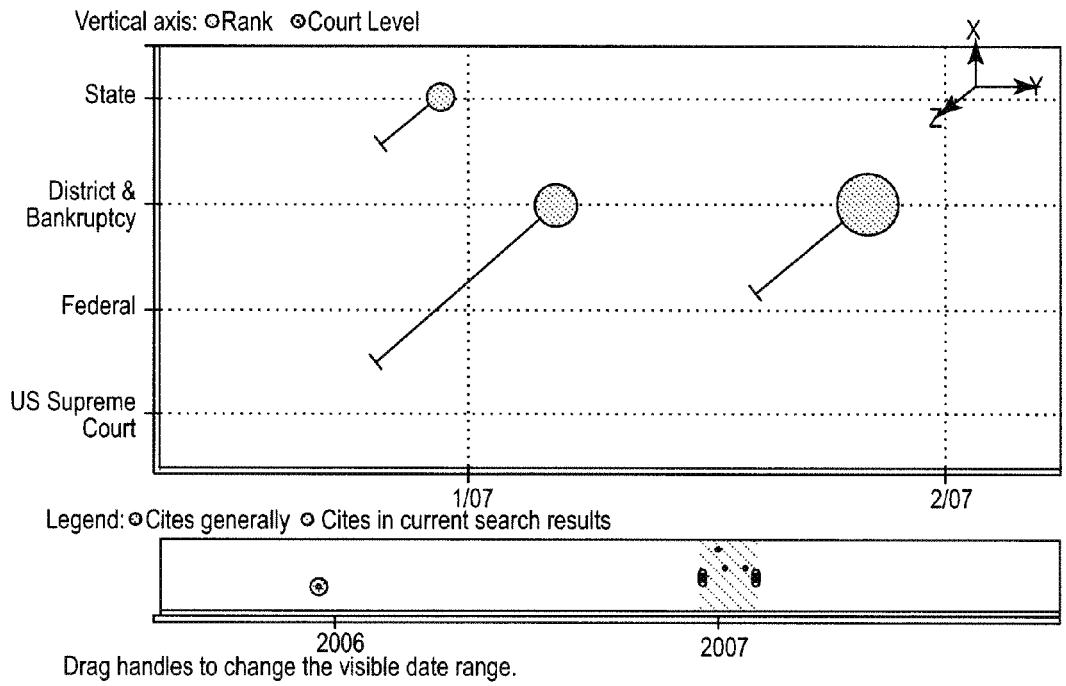
FIGS. 1A and 1B are exemplary representations of an interface screen displaying a two-dimensional projection or other portrayal of a three-dimensional graphic interface portraying three qualities of data or metadata in regard to individual items and additional metadata as further, additional dimensions.
Figure 1B:
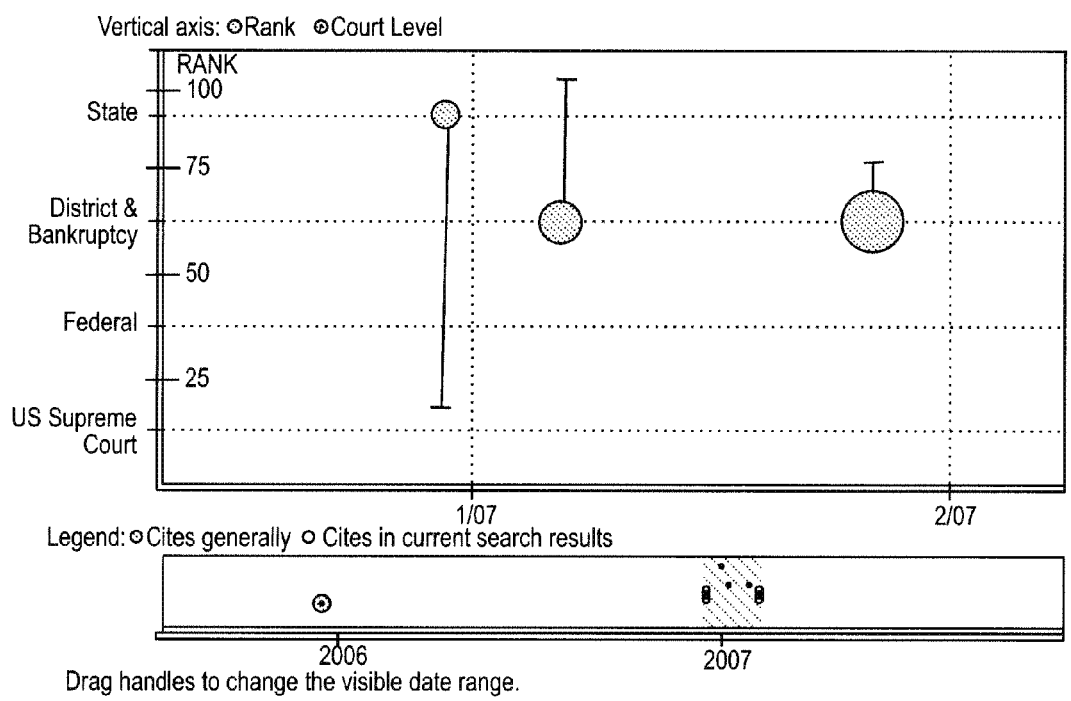

Alternatively, as a variant form of the invention, both vertical axis parameters can be selected and both rank and jurisdiction or any other quality or metadata portrayed as an additional dimension (e.g. "Z") as indicated in FIG. 1A (including indication that both buttons 180 are selected) which, as is preferred for clarity of portrayal in such a case, indicates date in the "X" direction, jurisdiction in the "Y" direction and rank in the "Z" direction; all of which are displayed as a three-dimensional orthographic (e.g. without perspective) projection on a two-dimensional display area. However, it should be understood that other forms of portraying this additional dimension are possible and may be much preferable if such a facility is included, an example of which is illustrated in FIG. 1B. Specifically, in FIG. 1B, exploiting the fact that two precisely contemporaneous items are extremely unlikely to contain citations to each other (as distinct from relation lines which will almost invariably have an "X" axis component, rank is portrayed as a vertical line to the "Y" position corresponding to the scalar rank with or without termination indicia for accuracy to avoid confusion with and to improve perception in regard to such relation lines, if included in the image. It should be appreciated that such additional dimension depictions may tend to clutter the screen if numerous items are depicted and providing for such visual distinction to be perceived (possibly enhanced by additional visual attributes such as blinking) or suppression of other dimensions of the display in accordance with the invention will normally be desirable.

It is preferred in practice of the invention to provide for various individual functionalities and display features as discussed above to be used singly or in various combinations to include representation of more or less data using correspondingly more or less information from data structure 320. Display features and combinations which have been found particularly useful will be now be described with reference to FIGS. 4A-8D. It should be understood that overlays such as the text box overlay depicted in FIG. 2 can be overlaid on any of the interface images described below at any time to obtain more particular information about a selected item and which particular information can be selected at the will of the user and/or specified as particular default information in regard to each variant interface screen.

The most basic variant of the interface of FIG. 1 is illustrated in FIG. 4A. In this case display 100 includes a (possibly attenuated and/or scrollable with the items graphically illustrated correspondingly limited) list 410 in the form of a text or dialog box or a pull-down menu or the like collectively represented thereby of prioritized search results together with a display of a single dot or icon corresponding to each item in the list superimposed on the graphics display in the manner of text box 210 of FIG. 2. Alternatively, the entire display in accordance with the invention can be superimposed on a suitably positioned list such as that developed by the above-incorporated U.S. patent application Ser. No. 09/707,911; resulting in the attenuated list appearing at location 420. Manipulation of the list corresponds to item selection and the two-dimensional mapping of items will be correspondingly altered. This interface screen and manipulation is particularly useful for facilitating comparison of citation patterns between items returned in the search result. For purposes of this interface screen, concentric circles are preferably suppressed by, for example, interrupting the citation statistics data (but not the citation data). Once a particular citation pattern of interest is determined, the concentric circle features can be restored by restoring (preferably in selected stages) the citation statistics input to circle/icon image generator 370 to result in the image discussed above in connection with FIG. 1 as illustrated in FIGS. 4B and 4C. This manipulation is one of many; representative ones of which will be discussed below, in which relatively limited information can be initially displayed to a user and, if considered to be potentially indicative of items germane to the search or evaluation thereof, additional information can be reintroduced in stages using additional display dimensions to confirm or reject that line of inquiry or to gain insight regarding search results from information about search results which is not necessarily responsive to a query, itself, to develop other searches or lines of inquiry.

Figure 5A:
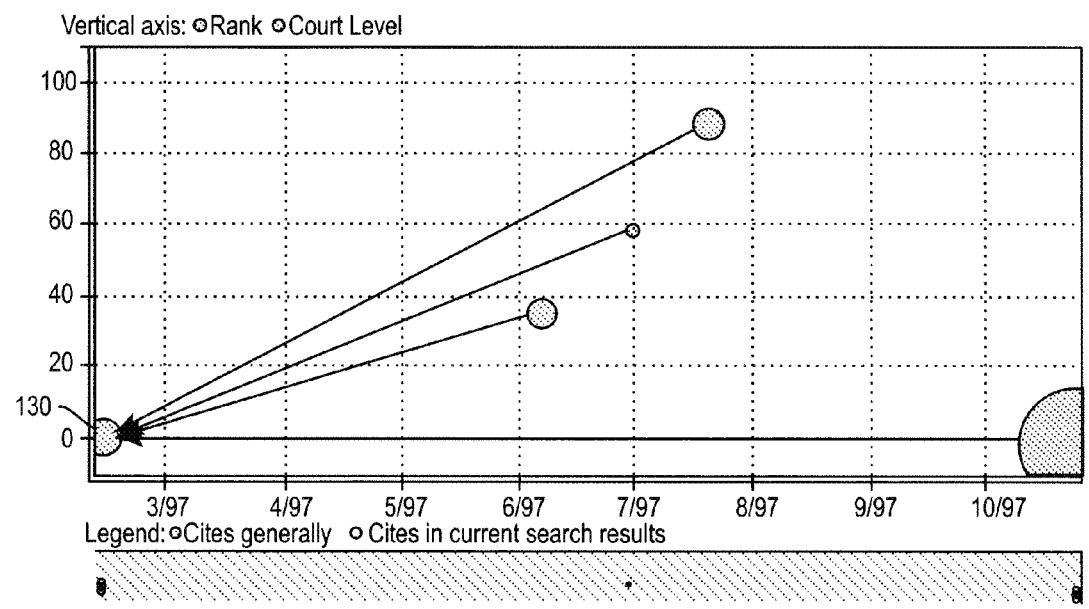
Figure 5B:
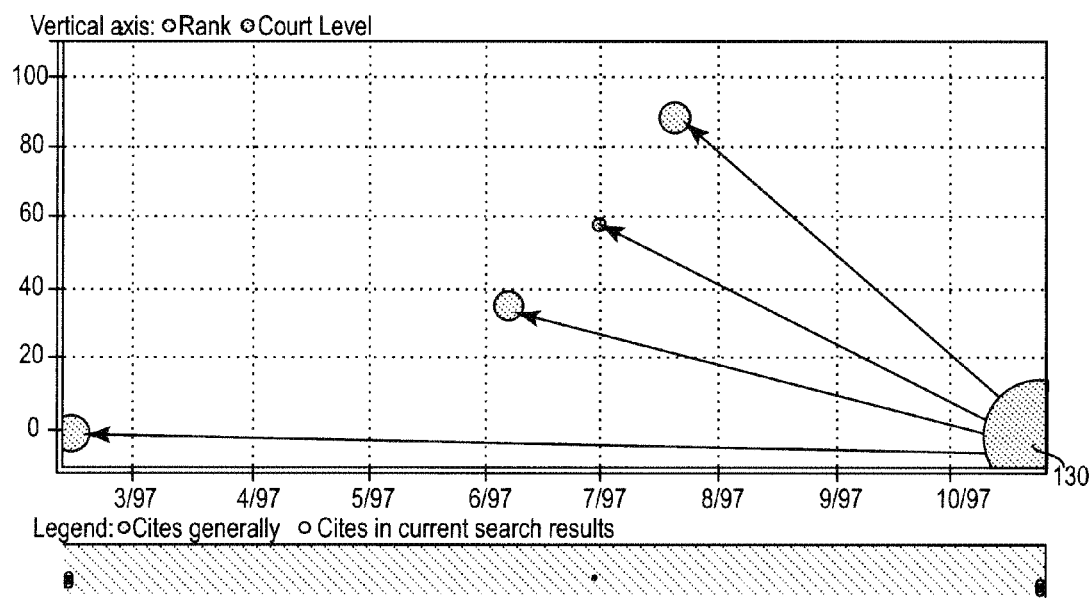
Figure 6:
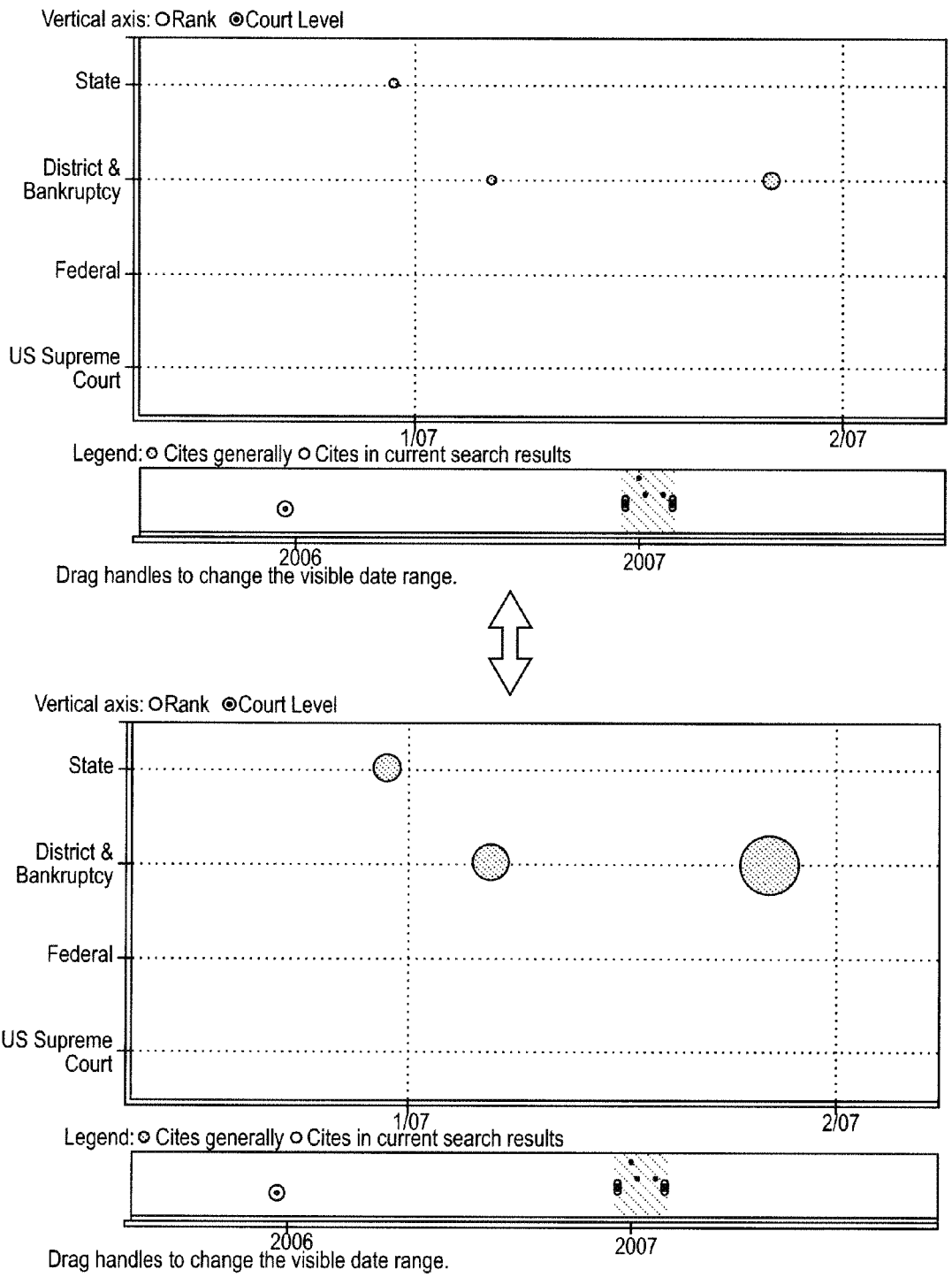

Another variant interface image screen is derived from the interface screen of FIG. 1 by providing for direct selection of either the right or left half of the screen thus limiting the graphic pattern to items citing to the selected item or cited by the selected item respectively as depicted in FIGS. 5A and 5B. In FIG. 5A, the left half of a screen such as that of FIG. 1 is displayed relative to selected item 130. For purposes of illustration of a particularly useful manipulation of the interface in accordance with the invention, in FIG. 5B a different item is selected and indicated by reference numeral 130 and thus FIG. 5B displays the same items as FIG. 5A but as the right half of the screen. This screen may be derived by suitable manipulation or interaction with display 110 discussed above, but it is preferred in view of the utility of this display to provide more direct access to it by, for example, keyboard or menu selection. It should be noted in this latter regard where this variant interface screen is controlled other than through display 110 (e.g. by a particular key stroke control) that display 110 is not included in the on-screen presentation to a user. It should also be noted that the selected item which differs between FIG. 5A and FIG. 5B can be discerned by clustering of relation lines or arrows in regard to an item depicted at the edge of the interface screen because the selected item is the item being analyzed at any given time and other relation lines of arrows are preferably suppressed to prevent or reduce congestion of the image. Thus, the item having its center at the left or right border of the interface screen and the greatest number of relation lines emanating therefrom or the greatest number of relation arrows pointing to or from it is necessarily the selected item.

Other variants of interface images in accordance with the present invention alter the data represented by the concentric circle or circles that may be included in an image similar to FIG. 1 as illustrated by comparison of FIGS. 4B and 4C. It has been found particularly useful to facilitate user evaluation of search results to have a concentric circle to represent all items in the database cited by and/or citing to the selected item and a small circle representing the subset of cases which are cited by or cite to the selected case (e.g. those on the screen). However, display of concentric circles can reflect raw number of citations for similar or different groups of items (e.g. 320a-320d) as in FIG. 1. It has also been found useful to provide for alteration of the circle sizes to reflect such numbers of items or actual citation numbers for comparison and it is preferred to provide for toggling back and forth as illustrated by a double arrow in FIG. 6 between any of these different displays representing statistics of different underlying citation statistics to facilitate comparisons. Such differences may convey several different types of information to a user such as the existence of another line of related items (e.g. published opinions) or the comparative quality of search queries in regard to a particular issue of specific subject matter (determination of which may and is likely to be facilitated by invoking text window 210 of FIG. 2 by a simple and intuitive "mouse-over" operation or the like). The text window 210 may then be manipulated by, for example, scrolling or sequencing through excerpts of text containing search terms).

Figure 7A:
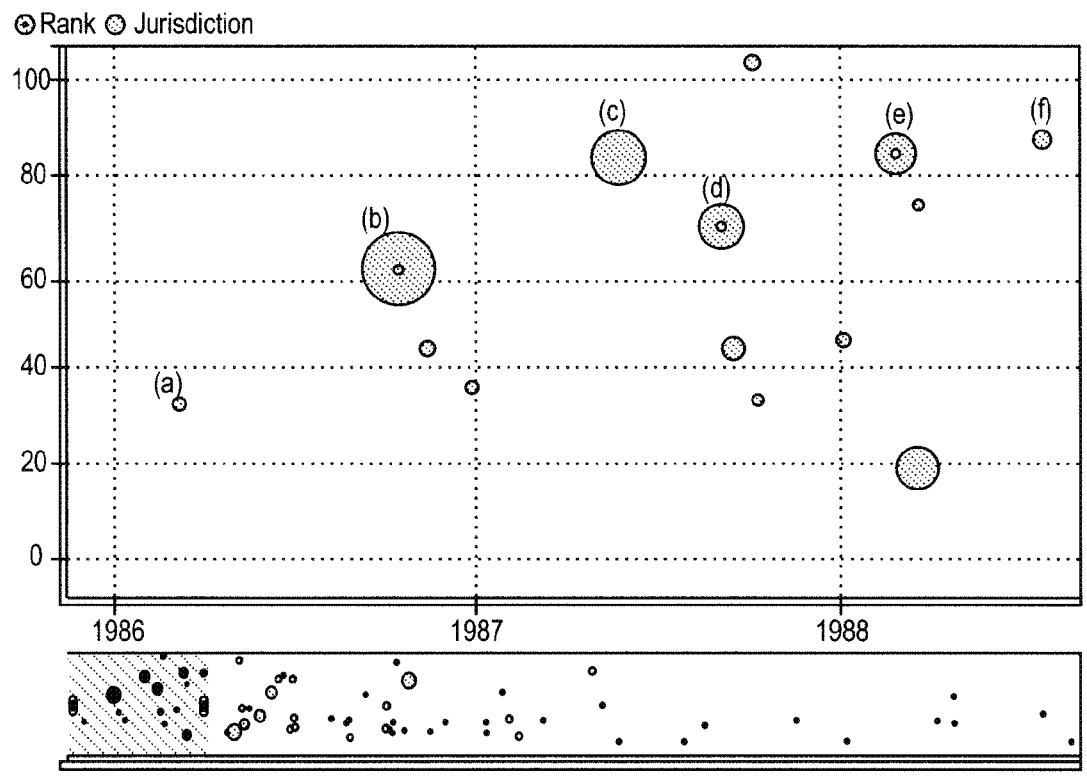
Figure 7B:
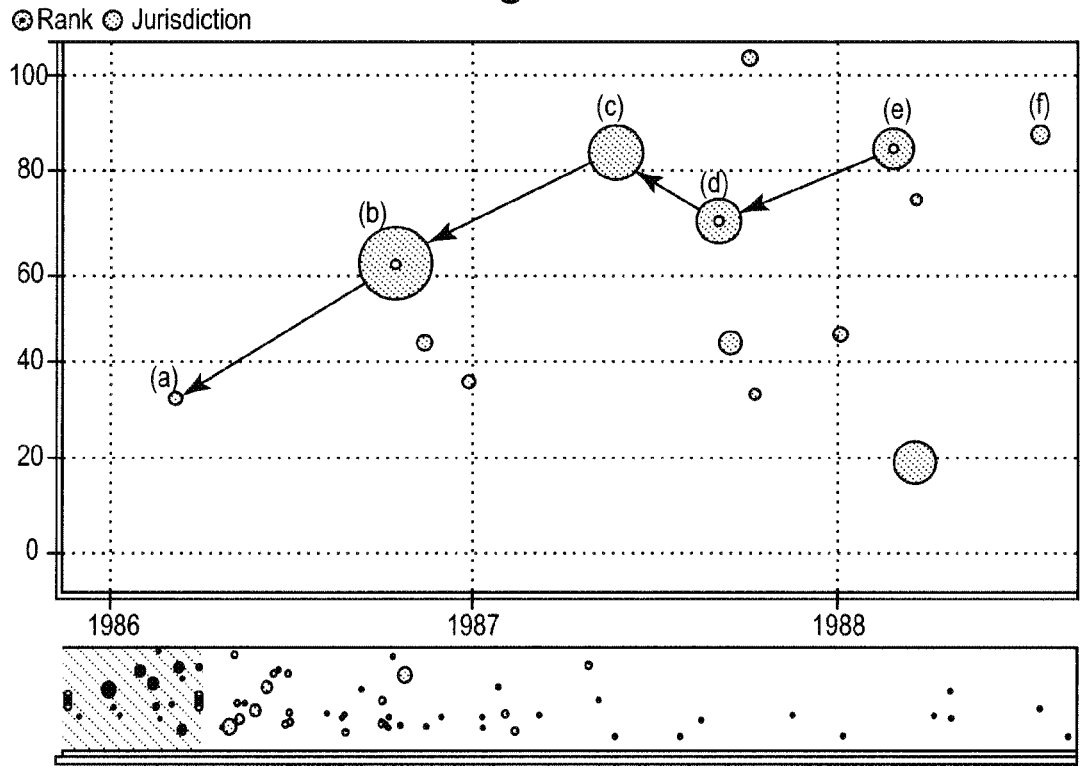

Another variant interface screen illustrated in FIGS. 7A and 7B which has been found useful is very similar in appearance to that of FIG. 1 but differs therefrom by not referencing the mapping to a selected item but simply applied to any arbitrary group of items such as a search result, database or portion of a database. In such a case, the mapping is determined based on the earliest and latest items in the group and the time line of the display adjusted accordingly. This interface screen is useful for obtaining information concerning the temporal distribution of items report in response to a search query and may be emphasized by suppressing both the authority and relevance information otherwise indicated by the "Y" dimension of the display; thus collapsing the display in the vertical direction into a single horizontal line. Grouping of items made more evident by such a manipulation may correspond to particular economic, political or other historical circumstances which may provide insight into rationales underlying particular lines of reasoning or subject matter. A particular line of sequential citations may be indicated by alphanumeric designations or other indicia which may also be applied to locations representing returned search items in any other interface screen as illustrated for example, in FIGS. 4A-4C.

Figure 8A:
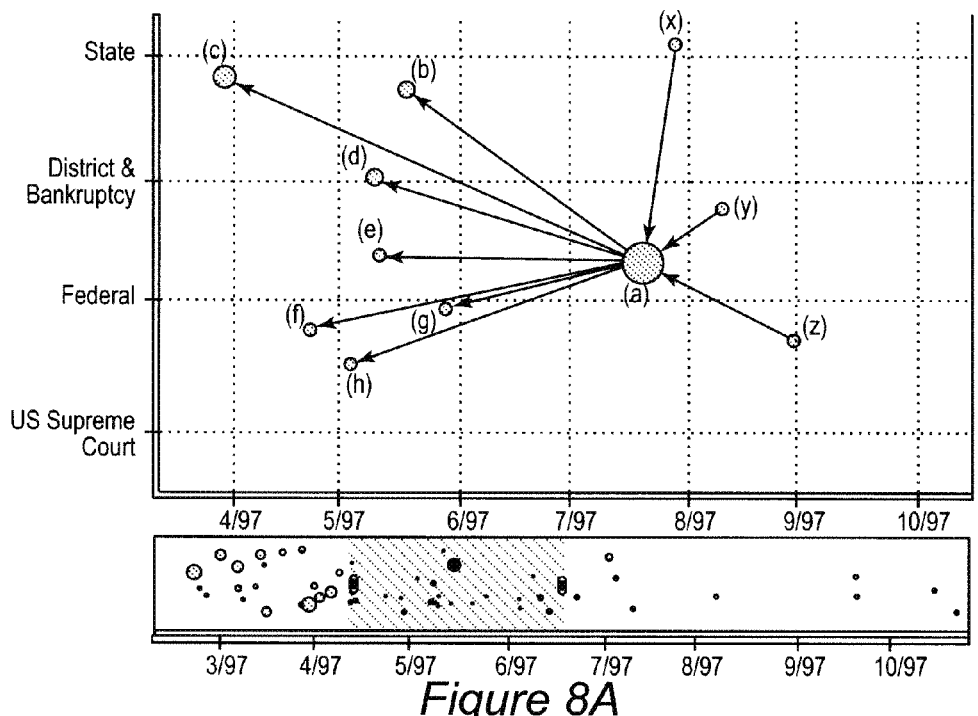
Figure 8B:
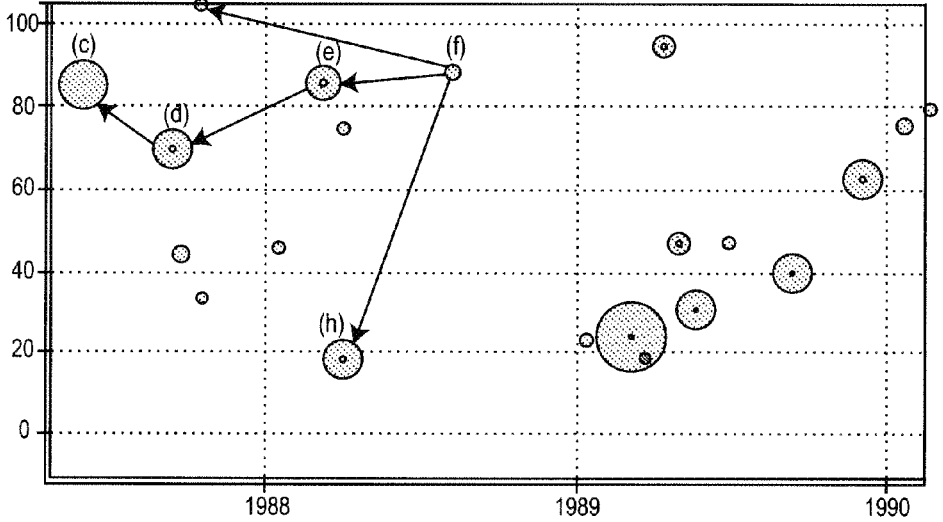
Figure 8C:
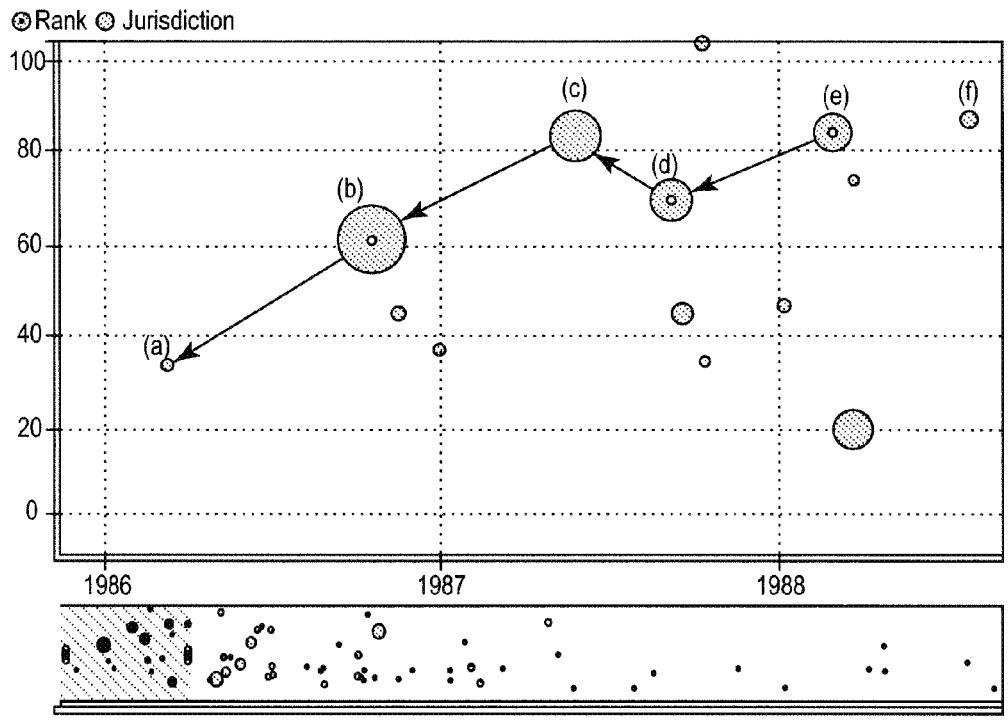
Figure 8D:
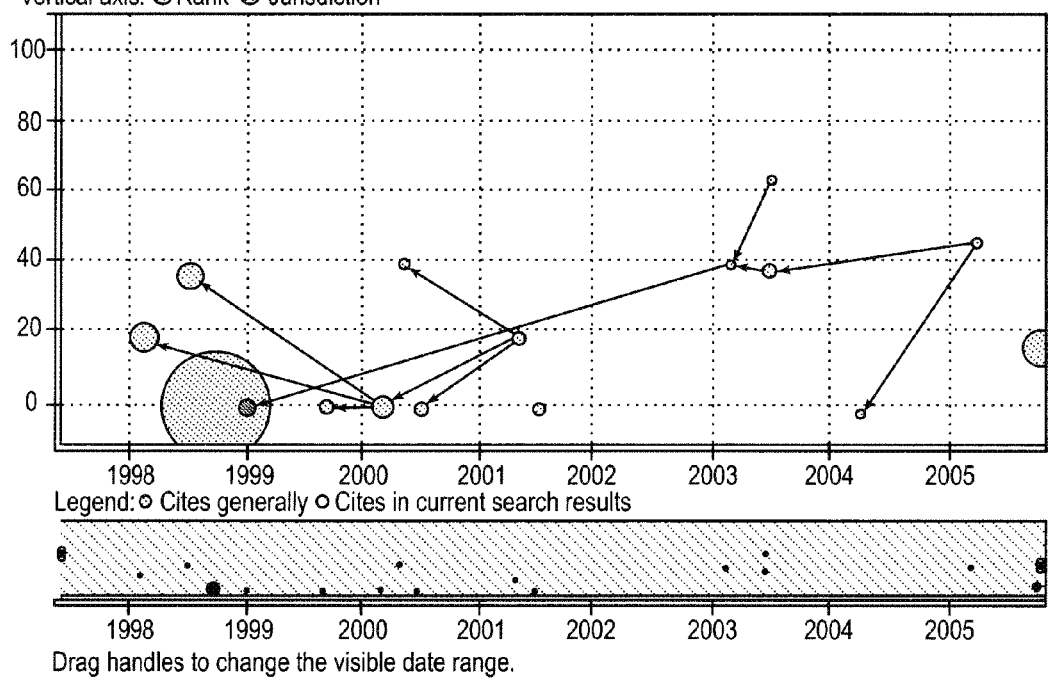

Again, as a perfecting feature of the invention which is not necessary to its practice in accordance with its most basic principles is the provision of relationship lines indicating the nature of the citation and/or the treatment thereof in the citing item as illustrated by comparison of FIGS. 7A and 7B, which may be overlaid on any interface screen as an additional dimension thereof. Such lines may tend to clutter the screen, however, as illustrated in FIG. 8D for a screen in which relatively few items and two lines of relationships with branching patterns which may indicate issues that may distinguish items in particular ways are represented. It is therefore preferred to provide for suppression of some lines or to emphasize some types of patterns, some of which can be adaptively learned by the invention from usage patterns in a manner well-understood in the art. For example, FIG. 8A shows only citations in and citations to a selected item by use of arrows. FIG. 8B illustrates a line of cases having sequential citations and another group where a plurality of precedent items were cited/relied upon in a single item. FIG. 8C illustrates a longer sequence of items where there has been sequentially reduced citation over time in later citations. Again, with experience, patterns of such lines or general tendencies and/or characteristics discernible in the pattern or comparative patterns (which may also be toggled to facilitate comparison in the manner of FIG. 6) of such lines can be used to substantial advantage in determining the relative order in which items returned by a search should be reviewed.

In view of the foregoing, it is seen that the graphic interface of the invention provides an easily used, highly informative depiction of various qualities of items (as may be selectively introduced into or removed from an interface image at the will of the user) which may be, for example, returned in response to a search query and which can be easily used and navigated to allow a user to determine an approach to review of individual items which can greatly expedite that process. Relationships of citations and citation statistics may be quantitatively portrayed but qualitatively and/or comparatively assimilated by a user through portrayal in an analog, quasi-qualitative fashion and/or in connection with various graphic attributes with accurate quantitative citation statistics and citation relationship information readily available. By the same token, the level of information presented can be readily and rapidly altered so that information that the user may find relevant is not obscured or the screen unduly cluttered, causing distraction. Moreover, the information which may be suppressed may be reintroduced by degrees at the will of the user to refine choices for review of items returned by a search. That is, in a multidimensional display as provided by the invention, the user is provided with the capacity to easily delete dimensions at will and to restore them, as desired, to assist in developing an understanding of the aspects of inter-relationships between the subject matter of individual items returned by a search query (which aspects may be too subtle or qualitative to express in an effective search query that can be determined, with confidence, not to exclude germane items) to assist in identifying particularly germane items among search results.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A graphic user interface capable of display of different types of information about a set of items in a selected number of dimensions, said interface including:
   a display screen, said display screen displaying:
      indicia representing individual ones from the set of items at respective locations on a two dimensional display area, wherein each item represents a physical object or data representing a physical object, respectively; and
      a plurality of types of information associated with said individual items and derived from analysis of content of and/or relationships between said individual items, said types of information being displayed as a plurality of visual attributes of said indicia, respectively; and
   a man-machine interface, responsive to user control, configured for selective suppression of display of each of two or more of said visual attributes.

2. The graphic user interface as recited in claim 1, wherein said items represent published legal decisions.

3. The graphic user interface as recited in claim 2, wherein one dimension of said two dimensional display represents the date of an item.

4. The graphic user interface as recited in claim 3, wherein another dimension of said two dimensional display represents authority of an item.

5. The graphic user interface as recited in claim 3, wherein another dimension of said two dimensional display represents accuracy of a match to a search query.

6. The graphic user interface as recited in claim 1, wherein one dimension of said two dimensional display represents authority of an item.

7. The graphic user interface as recited in claim 1, wherein one dimension of said two dimensional display represents accuracy of a match to a search query.

8. The graphic user interface as recited in claim 1, wherein said visual attributes comprise at least one of size, shape, one or more concentric shapes, icons, color, blinking, associated indicia at or adjacent said locations, and lines or arrows between said locations, said lines or arrows having particular line patterns, colors or blinking attributes between said locations.

9. The graphic user interface as recited in claim 1, wherein said visual attributes represent numbers of citations or statistics of citations, said citations being citations to and/or citations from an item represented by said interface.

10. The graphic user interface as recited in claim 1, wherein said visual attributes represent numbers of citations or statistics of citations, said citations being citations to and/or citations from an item represented by said interface of items in another set of items.

11. The graphic user interface as recited in claim 1, wherein said visual attributes represent numbers of citations or statistics of citations, said citations being citations to and/or citations from other items represented by said interface.

12. The graphic user interface as recited in claim 1, wherein said selective suppression of visual attributes of said interface provides for toggling between screens including different numbers of said visual attributes.

13. The graphic user interface as recited in claim 1, wherein said further information is stored as metadata.

14. The graphic user interface as recited in claim 1, further including a text box display.

15. The graphic user interface as recited in claim 14, wherein said text box includes quantitative information represented by said visual attributes.

16. The graphic user interface as recited in claim 1, further including a display generator wherein a selected number of said visual attributes and/or additional types of information is selectable by a user, said display generator further including means for selectively controlling particular types of said additional information pertaining to said items in a selectable plurality of said visual attributes in respective instances of said display.

17. The graphic user interface as recited in claim 16, wherein said means for selectively controlling particular types of information to be displayed further includes means for displaying and selecting from pull-down menus or a text or dialog box.

18. The graphic user interface as recited in claim 1, further including a display generator, said display generator further including means for limiting a number of said indicia representing individual items.

19. The graphic user interface as recited in claim 18, wherein said means for limiting a number of said indicia representing individual items includes means for specifying a date range for said items.

20. The graphic user interface as recited in claim 1, further including a secondary display as a condensation or abridgement of a display of said indicia representing individual items.

21. The graphic user interface as recited in claim 1, wherein said visual attributes comprise:
   at least one of lines and arrows that extend substantially in parallel from the indicia, respectively, wherein a length of a given one of the lines and arrows is indicative of a magnitude of a type of information represented thereby.

22. The graphic user interface as recited in claim 21, wherein:
   the display screen is configured to arrange the two dimensional display area as a three-dimensional orthographic projection thereonto; and the at least one of lines and arrows, respectively, are arranged along a non-two-dimensional axis of the three dimensional projection.

23. The graphic user interface as recited in claim 1, wherein:
- the man-machine interface is further configured to:
  - receive a designation of one amongst the indicia; and
- the display screen is configured to arrange remaining ones of the indicia within the two dimensional display area based on a location of the designated indicium.

24. The graphic user interface as recited in claim 23, wherein the display screen is further configured to:
- locate the designated indicium substantially at the center of the two dimensional display area.

25. A method of operating a search engine for searching a database, said method comprising:
- configuring data processing apparatus to include:
- a memory for storing data derived from parsing items in said database, said items representing a physical object or data representing a physical object; and a display generator for:
  - generating indicia displayable at respective locations on a two dimensional display area, the indicia representing selected ones of the items, respectively; and
  - representing respective types of said data associated with the items as visual attributes of the indicia on the two dimensional display area; and
- a man-machine interface by which display of each of at least two of said visual attributes representing types of data, which otherwise are included in an image produced on the display area driven by said display generator, is selectively suppressible by a user.

26. A method as recited in claim 25, further including configuring said data processing apparatus to include an overlay display generator.

27. A method as recited in claim 26 wherein said overlay generator produces a text box display.

28. A method as recited in claim 26, wherein:
- the man-machine interface is further configured to:
  - receive a designation of one amongst the indicia; and
- the display generator is configured to arrange remaining ones of the indicia within the two dimensional display area based on a location of the designated indicium.

29. A method as recited in claim 28, wherein the display generator is further configured to:
- locate the designated indicium substantially at the center of the two dimensional display area.

\* \* \* \* \*